(12) United States Patent
Scott

(10) Patent No.: US 12,514,725 B2
(45) Date of Patent: Jan. 6, 2026

(54) MODULAR SYSTEM FOR AIDING VISUALLY OR COGNITIVELY IMPAIRED OR BLIND INDIVIDUALS IN PERCEIVING THEIR SURROUNDINGS

(71) Applicant: Unwired Things ApS, Copenhagen (DK)

(72) Inventor: Craig Scott, Gentofte (DK)

(73) Assignee: Unwired Things ApS, Copenhagen (DK)

( * ) Notice: Subject to any disclaimer, the term of this patent is extended or adjusted under 35 U.S.C. 154(b) by 21 days.

(21) Appl. No.: 18/721,299

(22) PCT Filed: Oct. 27, 2022

(86) PCT No.: PCT/DK2022/050222
§ 371 (c)(1),
(2) Date: Jun. 18, 2024

(87) PCT Pub. No.: WO2023/116998
PCT Pub. Date: Jun. 29, 2023

(65) Prior Publication Data
US 2025/0057675 A1     Feb. 20, 2025

(30) Foreign Application Priority Data
Dec. 20, 2021   (DK) .......................... PA 2021 70634

(51) Int. Cl.
*A61F 4/00*     (2006.01)
*A61F 9/08*     (2006.01)
(Continued)

(52) U.S. Cl.
CPC .................. *A61F 4/00* (2013.01); *A61F 9/08* (2013.01); *G08B 7/06* (2013.01); *G09B 21/007* (2013.01)

(58) Field of Classification Search
CPC .... A61F 4/00; A61F 9/08; G08B 7/06; G09B 21/007
See application file for complete search history.

(56) References Cited

U.S. PATENT DOCUMENTS

| | | |
|---|---|---|
| 9,661,118 B1 | 5/2017 | Mucha |
| 10,070,211 B2 * | 9/2018 | Fan .................. H04R 1/005 |

(Continued)

FOREIGN PATENT DOCUMENTS

| | | |
|---|---|---|
| CH | 697266 | 7/2008 |
| CZ | 300785 | 8/2009 |

(Continued)

OTHER PUBLICATIONS

International Search Report and Written Opinion for International PCT Patent Application No. PCT/DK2022/050222, mailed Feb. 1, 2023 (9 pages).

*Primary Examiner* — John A Tweel, Jr.
(74) *Attorney, Agent, or Firm* — Fox Rothschild LLP; Carol E. Thorstad-Forsyth

(57) ABSTRACT

A system (1) for aiding visually impaired or blind individuals in perceiving their surroundings, and comprising a central device (2) comprising a transmitter/receiver (207), a processor (211) and a feedback unit (208, 209), and a peripheral device (3) comprising an ID memory chip (308). The central device (2) is configured to: by the transmitter/receiver (207), receive and transmit data signals to and from the one or more peripheral devices (3), by the processor (211), receive input through one or more of tactile input units, acoustic input units and gesture recognition input units provided on one or more of the central device (2) itself and the one or more peripheral devices (3), upon connection to a peripheral device (3), detecting the ID memory chip (308) of the peripheral device (3) reading data contained in the ID memory chip (308) of the peripheral device (3), and control (Continued)

the one or more peripheral devices (3) to perform at least one action, and by the feedback unit (208, 209), provide at least one of audible, visual and tactile feedback in dependence of the action performed by the one or more peripheral devices (3). The central device (2) further comprises a connection element (203) configured for physical connection to a complementary connection element (303) provided on at least one of the one or more peripheral devices (3) such as to enable data transfer between the central device (2) and the peripheral device (3), and the connection element (203) of the central device (2) is configured to support communication with any 20 combination of SPI, I2C, I2S audio, Pulse Wave Modulation and GPIO control operations in isolation or in parallel.

14 Claims, 4 Drawing Sheets

(51) Int. Cl.
    *G08B 7/06*          (2006.01)
    *G09B 21/00*       (2006.01)

(56) References Cited

U.S. PATENT DOCUMENTS

| | | | |
|---|---|---|---|
| 10,327,715 B2 * | 6/2019 | Won | A61F 4/00 |
| 10,594,797 B2 * | 3/2020 | Kang | H04W 4/12 |
| 10,997,090 B2 * | 5/2021 | Ren | G06F 13/14 |
| 11,592,926 B2 * | 2/2023 | Tate, II | G06F 3/0441 |
| 2015/0330787 A1 | 11/2015 | Cioffi et al. | |
| 2016/0250752 A1 | 9/2016 | Djugash et al. | |
| 2017/0032787 A1 | 2/2017 | Dayal | |

FOREIGN PATENT DOCUMENTS

| | | | |
|---|---|---|---|
| WO | 9620466 | 7/1996 | |
| WO | 03107039 | 12/2003 | |
| WO | WO-2015121846 A1 * | 8/2015 | G09B 21/007 |

* cited by examiner

203

| | | | | | |
|---|---|---|---|---|---|
| SPI_CLK/GND | 1 | GND_1 | GND_3 | 24 | GND |
| I2S_AU_DATA | 2 | SSTXP1 | SSTXP2 | 23 | I2S_AU_BCLK |
| AUMODE_EXT | 3 | SSTXN1 | SSTXN2 | 22 | SPI_MOSI |
| VCC5V | 4 | VBUS_1 | VBUS_3 | 21 | VCC5V |
| AINOUT_x | 5 | CC1 | CC2 | 20 | DINOUT_x |
| LEDDEV_CMN | 6 | DP1 | DP2 | 19 | DEVDETECT_x |
| I2C_SCL_x | 7 | DN1 | DN2 | 18 | VCC33V |
| I2C_SDA_x | 8 | SBU1 | SBU2 | 17 | !WRITE! |
| VCC5V | 9 | VBUS_2 | VBUS_4 | 16 | VCC5V |
| !SPI_CS_x! | 10 | SSRXN2 | SSRXN1 | 15 | SPI_MISO |
| CINOUT_x | 11 | SSRXP2 | SSRXP1 | 14 | I2S_AU_LRCLK |
| GND | 12 | GND_2 | GND_2 | 13 | VCC33V |

206

20301 - 20312  20313 - 20324

MODULAR SYSTEM FOR AIDING VISUALLY OR COGNITIVELY IMPAIRED OR BLIND INDIVIDUALS IN PERCEIVING THEIR SURROUNDINGS

CROSS REFERENCE TO RELATED APPLICATIONS

This application is a U.S. National Phase Application of PCT International Application No. PCT/DK2022/050222, filed on Oct. 27, 2022, which is an International Application of and claims the benefit of priority to Danish Patent Application No. PA 2021 70634, filed on Dec. 20, 2021. The entire contents of these Patent Applications are herein incorporated by reference.

TECHNICAL FIELD

The present invention relates to a system for aiding visually impaired or blind individuals in perceiving their surroundings, the system comprising a central device and one or more peripheral devices. The system may also be a system for aiding other persons with reduced mobility or sensory or cognitive function.

BACKGROUND ART

Many devices for aiding the blind and visually impaired exist on the market. Such devices predominantly include various intelligent blind sticks as well as various intelligent navigation aids.

CH 697266 B1 discloses an electronic device for assisting a user, particularly a blind user. The device comprises portable user equipment with input means for input of information by a user, acoustic and/or tactile expenditure means to the expenditure of information to the user and user-lateral radio means to send and receive radio signals, and several object devices for installation at an object in an environment of the user. Each object device comprises memory means for storing information and radio means to bi-directional radio communication with the user-lateral radio means.

Another known product for visually impaired users is the devices in the Milestone series from Bones AG in Switzerland. These devices have a "plug-in" concept and are essentially an electronic audio book reader but may further comprise an add-on device which can be plugged into it and which as the only func-tionalities can recognize colours or scan a barcode. The add-on devices are called respectively FaMe (developed by Vistac GmbH) and Woodscan. The Milestone device and the add-on device are connected by means of a simple standard-type connection such as a mini-USB port.

However, the known devices are configured for providing only a specific type of input to the main device and are thus limited in their functionality.

Therefore, there is a desire to provide a device of the type mentioned by way of introduction, which is capable of a wider variety of tasks based on a wider variety of inputs as well as providing the ability to control various types of outputs to the user. Such tasks may include measurement of its surroundings, playback of audio, generating light and notifying the user of changes which may have occurred in the surroundings.

SUMMARY OF INVENTION

It is therefore the object of the invention to provide a device or system for aiding visually impaired or blind individuals in perceiving their surroundings, which system is capable of performing a wider variety of tasks based on a wider variety of inputs and outputs.

It is a further object of the invention to provide such a system which is also simple and straight-forward to use for visually impaired or blind individuals.

These and other objectives are achieved by means of a system for aiding visually impaired or blind individuals in perceiving their surroundings, the system comprising a central device comprising a transmitter/receiver, a processor and a feedback unit, and one or more peripheral devices comprising an ID memory chip, the central device being configured to:
a) by the transmitter/receiver, receive and transmit data signals to and from the one or more peripheral devices,
b) by the processor, receive input through one or more of tactile input units, acoustic input units and gesture recognition input units provided on one or more of the central device itself and the one or more peripheral devices,
c) by the processor, upon connection to a peripheral device, detecting the ID memory chip of the peripheral device and reading data contained in the ID memory chip of the peripheral device,
d) by the processor, control, preferably based on the input and the data read from the ID memory chip, the one or more peripheral devices to perform at least one action, and
e) by the feedback unit, provide at least one of audible, visual and tactile feedback in dependence of the at least one action performed by the one or more peripheral devices,
the central device further comprising a connection element configured for at least one of physical connection and connection by means of a radio-based communication protocol such as Bluetooth or WIFI to a complementary connection element provided on at least one of the one or more peripheral devices such as to enable data transfer between the central device and the peripheral device, and
the connection element of the central device being configured to support communication with any combination of SPI, I2C, I2S audio, Pulse Wave Modulation and GPIO control operations in isolation or in parallel.

Thereby, and particularly by providing that the central device comprises a connection element configured for physical connection or connection by means of a radio-based communication protocol such as Bluetooth or WIFI to a complementary connection element provided on at least one of the one or more peripheral devices such as to enable data transfer between the central device and the peripheral device, a system for aiding visually impaired or blind individuals in perceiving their surroundings is provided with which the central device and the peripheral device may be connected in a simple, straight forward and unambiguous manner. The provision of a physical connection further improves this effect by making the connection process more tactile and intuitive for visually impaired or blind individuals.

By further providing that the connection element of the central device is configured for communication with any combination of SPI, I2C, I2S audio, Pulse Wave Modulation and GPIO control operations in isolation or in parallel, a system for aiding visually impaired or blind individuals in perceiving their surroundings is provided with which the central device and the peripheral device may be connected with each other using the same connection element on the central device irrespective of the type of the peripheral device, particularly irrespective of the type of electrical or radio-based communication protocol used by the peripheral device. Thereby, the need for visual identification of a particular type of connection element amongst several connection elements which would otherwise be needed on the central device is eliminated.

It is noted that SPI, I2C and I2S are protocols for wire based electrical communication over short distances commonly used by small sensors and audio devices. Pulse Wave Modulation (PWM) is a means of digitally communicating a signal through varying the on/off durations of a signal at a fixed peri-od/frequency. If the central device is connected to the peripheral device via Bluetooth, these protocols will not be those used. Rather there will be a small processor in the peripheral which needs to translate these I2C/SPI/I2S protocols and pack the data from them into, e.g., Bluetooth or WIFI data frames for radio transmission.

By thus providing a connection element as described above and allowing for detachable peripheral devices, the central device is enabled to support a wide range of different functions required by a visually impaired or blind person, through the attachment of peripheral devices to address each requirement. As the central device is relatively expensive and the peripheral devices relatively cheap, without a need for their own battery or a processor, a more cost-effective overall system is thereby provided.

Thereby, a system for aiding visually impaired or blind individuals in perceiving their surroundings which is simple and straight forward to use for visually impaired or blind individuals is provided.

Furthermore, such a system enables a wider variety of tasks based on a wider variety of input to be performed, especially by virtue of the central device being configured to control the peripheral devices based on input.

In an embodiment, the connection element of the central device comprises a plurality of pins, each pin of the plurality of pins being dedicated for communication with a pre-defined communication protocol of the plurality of pre-defined communication protocols.

Thereby a connection element providing the above advantages and further having a particularly simple construction is provided for. Also, such a structure of the connection element allows for aligning power supply pins with standard locations known from standard connector pinouts, thereby reducing the risk of device damage if, e.g., a standard connector cable from another manufacturer of the same physical form is mistakenly inserted into the main device or a peripheral device.

In an embodiment, the plurality of pins comprises any one of 10 pins, 12 pins, 14 pins, 16 pins, 18 pins, 20 pins, 22 pins and 24 pins.

Thereby a connection element is provided which covers the most commonly used numbers of connection pins, and which also comprises a sufficient number of pins to enable support of a wide range of the most used short-range electrical interconnection protocols.

In an embodiment, the connection element of the central device comprises a plurality of pins, and the plurality of pins is configured to support any combination of SPI, I2C, I2S audio, Pulse Wave Modulation and GPIO control operations in isolation or in parallel.

Thereby a connection element is provided which covers support of a wide range of the most used internet protocols in one.

In an embodiment, the one or more peripheral devices comprise at least one sensor, and the central device is further configured to: by the processor, control, preferably based on the input, the one or more peripheral devices to perform an action in the form of measuring or detecting at least one of an object, a property of an object and a property of the surroundings, and by the feedback unit, provide at least one of audible, visual and tactile feedback in dependence of at least one of an object, a property of an object and a property of the surroundings measured or detected by the one or more peripheral devices.

It is noted that as used herein, the term "sensor" is intended to mean a device which detects or measures a physical property and records, indicates, or otherwise responds to it.

By thus providing a connection element as described above and allowing for detachable peripheral sensor devices, the central device is enabled to support a wide range of different functions related to sensing various parameters of the surroundings required by a visually impaired or blind person, through the attachment of peripheral devices to address each requirement.

In an embodiment, the connection element of the central device further is configured to support a plurality of different input voltages.

In an embodiment, the connection element of the central device is configured to support at least input voltages of 5 V, 3.3 V and 1.8 V.

Thereby a connection element is provided which is enabled to support a wide range of current and future technologies as present sensors and detectors predominantly use voltages of 5 V and 3.3 V, whilst newer sensors and detectors tend towards using voltages of 1.8 V.

In an embodiment, the connection element of the central device further comprises a detection pin dedicated and configured to enable the central device to automatically detect a peripheral device of the one or more peripheral devices upon connection of the peripheral device to the central device.

Thereby, the central device is enabled to detect and optionally also identify the peripheral device automatically in a simple and straight forward manner, such as to ensure that only approved peripheral devices are allowed to cooperate with the central device. Identification or detection of a peripheral device being connected to the central device also enables the central device to only power up when a peripheral device is detected, thus saving power.

In an embodiment, the complementary connection element of at least one of the one or more peripheral devices comprises a complementary detection pin configured for connection to the detection pin of the connection element of the central device.

Thereby, the connection to be established to allow the central device to detect and optionally also identify the peripheral device automatically may be established in a simple and straight forward manner.

In an alternative embodiment, the central device comprises a detection pin arranged separately from the connection element of the central device and configured for connection to a corresponding detection pin of a peripheral device of the one or more peripheral devices such as to enable the central device to automatically detect the peripheral device upon connection of the peripheral device to the central device.

Thereby, and in addition to the above-mentioned advantages, the connection to be established to allow the central device to detect and optionally also identify the peripheral device automatically may be made without taking up a pin of the connection element of the central device.

In an embodiment, at least one of the one or more peripheral devices comprises a complementary detection pin configured for connection to the detection pin of the central device.

Thereby, the connection to be established in order to allow the central device to detect and optionally also identify the peripheral device automatically may be established in a simple and straight forward manner without taking up a pin of the connection element of the peripheral device.

In an embodiment, the central device further is configured to, via the detection pin or via a pin of the plurality of pins, automatically detect and read from an ID memory chip of the peripheral device upon detection of the peripheral device, or through scanning for nearby Wifi and Bluetooth based radio transmissions.

The ID memory chip may contain a type identifier for the peripheral, as well as a serial number and potentially also calibration data and settings for any sensors on the peripheral.

Thereby the security of the system is improved since it is enabled that copied peripheral devices or peripheral devices with invalid serial numbers will not be permitted to operate. The ID memory chip may also contain information, such as serial numbers, registering the peripheral device as belonging to a particular user, thus reducing the risk of theft. The ID memory chip may be a separate chip provided in the peripheral device. The ID memory chip may also form part of another, existing, chip, such as another, existing, memory chip, of the peripheral device. The ID memory chip may also contain information such as an identification of the type of device and a MAC address or a Bluetooth identifier of the peripheral device.

A further advantage is that detection of an ID memory chip enables the central device to, based on the type of the peripheral device, load the correct driver software to manage the peripheral device and inform the user what type of peripheral device has been attached. Still further the input device, especially if provided as buttons, of the central device may also be controlled to take on different functions, depending on what capabilities need to be managed for the peripheral device.

In an embodiment, the central device comprises an incision or a cut-out shaped to conform to an external shape of the one or more peripheral devices, the incision or the cut-out being configured to allow the peripheral device to be connected to the central device in only one predefined orientation.

Thereby, the central device and the peripheral device may be connected in a particularly simple, straight forward and unambiguous manner. The provision of such a cut-out further improves this effect by making the connection process particularly tactile and intuitive for visually impaired or blind individuals.

In an embodiment, the central device is configured to provide at least one of audible, visual or tactile feedback on each and every operation or operational step of at least one of operating the central device and operating the peripheral device.

Thereby a system is provided which may guide and aid a visually impaired or blind person every step of the way towards obtaining the desired information. Thus, a system is provided which is particularly simple and straight forward to use for a visually impaired or blind person, and with which operational errors may be indicated to the user without delay.

In an embodiment, the central device is configured to enable providing audible feedback in a plurality of languages selectable by a user.

Thereby, a system is provided which has built-in features allowing for use and distribution in a multitude of countries and regions without separate adaptation, other than the end user selecting the desired language.

In an embodiment, each peripheral device of the one or more peripheral devices is configured to perform at least two different measurements and detections.

Thereby the number of peripheral devices needed in the system may be reduced, and the number of exchanges of peripheral devices needed may also be reduced. Thus, a simpler system with fewer components is provided for.

In an embodiment, the one or more peripheral devices are configured to perform one or more of the following measurements and detections:

Measure a parameter of the surroundings, such as but not limited to air temperature, air humidity, brightness and wind force.
Detect motion in the nearby area.
Enable flashlight with variable brightness and colour hue.
Enable magnification.
Detect the type of an object.
Measure the length, width or depth of an object, e.g. using a sliding caliper.
Detect distance to an object.
Detect a colour of an object.
Measure pulse or blood oxygen levels.
Measure blood pressure or glucose levels.
Detect smoke and/or air quality.
Battery voltage for various types of batteries
Display of information on a small screen The above list illustrates the versatility of the present invention in terms of a number of measurements and detections which may be available. However, the above list should not be seen as exhaustive, merely as examples, as other measurements and detections are also feasible. The peripheral device may also be an existing third-party product or device, such as an oven, microwave, washing machine etc which has a suitable control interface for Bluetooth or WIFI interaction.

In an embodiment, the central device is configured to provide one or more of the following types of feedback:
Audible feedback, such as sound or spoken word.
Tactile feedback, such as a vibration or a pattern of vibrations.
Visual feedback in the form of flashing or coloured lights
Haptic feedback.
Feedback indicating that a measurement result is larger than or smaller than a pre-set measurement threshold.
Feedback identifying the measurement result in units of measurement configurable by the user
Transmission of data to a remote device such as a computer, mobile telephone or central internet server Thereby, a system is provided with which feedback may be given in a clear and easy to understand manner to the user during device operation to make it clear to the user e.g. what state the device has, what options and controls are available to the user, and what measurement or detection results are achieved.

In an embodiment, at least one of the central device and the one or more peripheral devices is configured to be controlled and configured by an app, such as an app on a SmartPhone or a tablet computer.

Thereby, a system is provided in which particularly the central device, but in principle also the peripheral devices, may be updated, configured and controlled in a particularly simple manner. Updates, configurations and controls may in this way even be supported by voice guidance.

In an embodiment, at least one of the central device and the one or more peripheral devices is configured to transmit and receive data signals over WIFI or Bluetooth or other radio-based communication protocols.

Thereby, a system is provided in which the central device and the peripheral devices may communicate with each other in a particularly simple manner using data networks or communication means generally available.

In an embodiment, the central device is configured to simultaneous physical connection, by the connection element of the central device, to complementary connection elements provided on at least two peripheral devices comprised by the system such as to enable data transfer between the central device and the at least two peripheral devices.

Thereby, a system is provided with which the versatility in terms of measurements and detections available is increased even further, while still being very simple and straight forward to use and operate for a visually impaired or blind person.

In an embodiment, the central device is configured to connect with, identify and operate peripheral devices by means of radio-based communication protocols.

BRIEF DESCRIPTION OF DRAWINGS

In the following description embodiments of the invention will be described with reference to the schematic drawings, in which.

DESCRIPTION OF EMBODIMENTS

Figure 1:
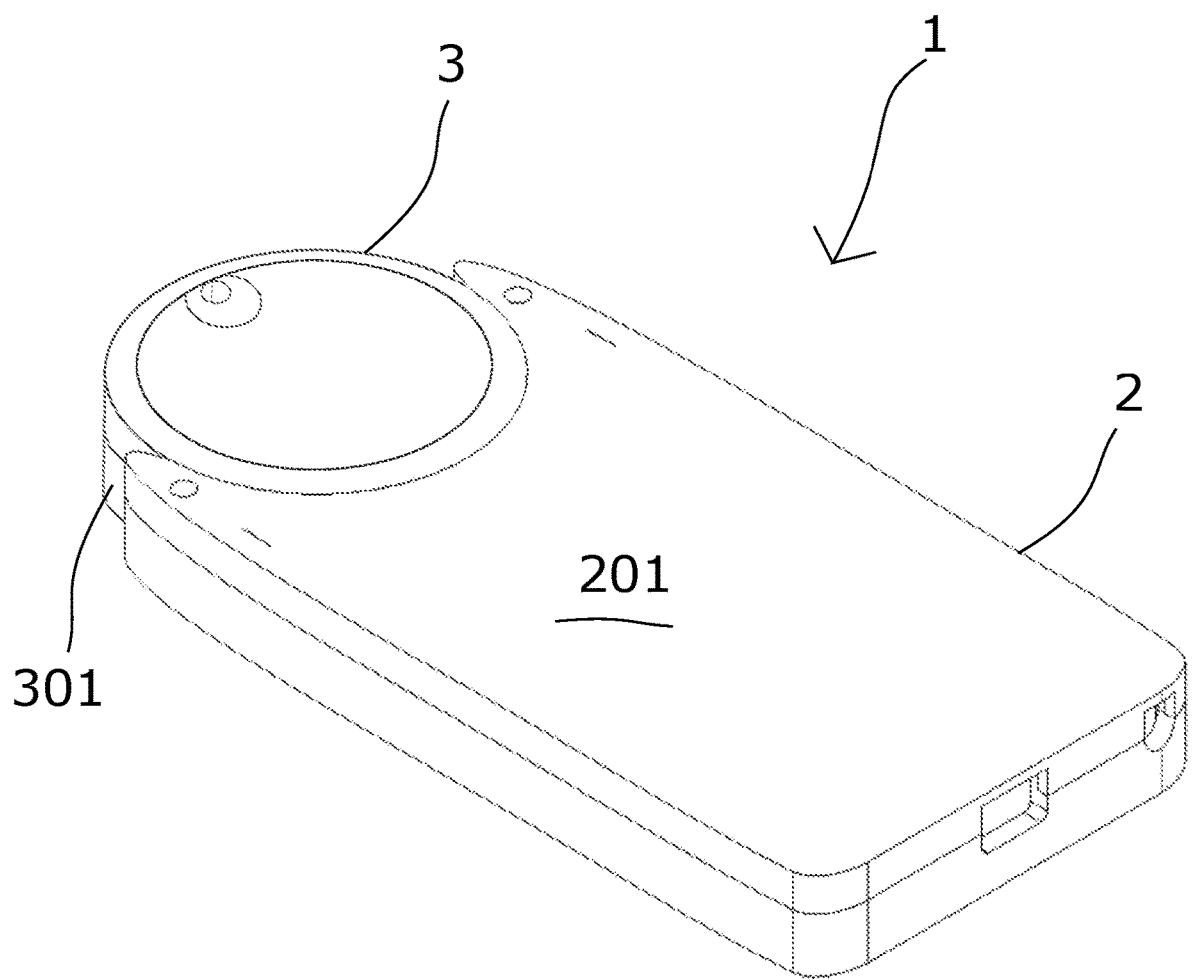
FIG. 1 shows a perspective view of a system according to the invention and comprising a central device and a peripheral device connected to one another.

FIG. 1 shows a perspective view of a system 1 according to the invention. Generally, and irrespective of the embodiment, the system 1 comprises a central device 2 and a peripheral device 3. The system 1 comprises in the embodiment shown one peripheral device 3. The system 1 may also comprise more than one, such as two or three, peripheral devices 3. As shown on FIG. 1, the central device 2 and the peripheral device 3 are connected to one another, physically and to enable transfer of data between the central device 2 and the peripheral device 3. The central device 2 comprises a housing 201. The peripheral device 3 comprises a housing 301.

Figure 3:
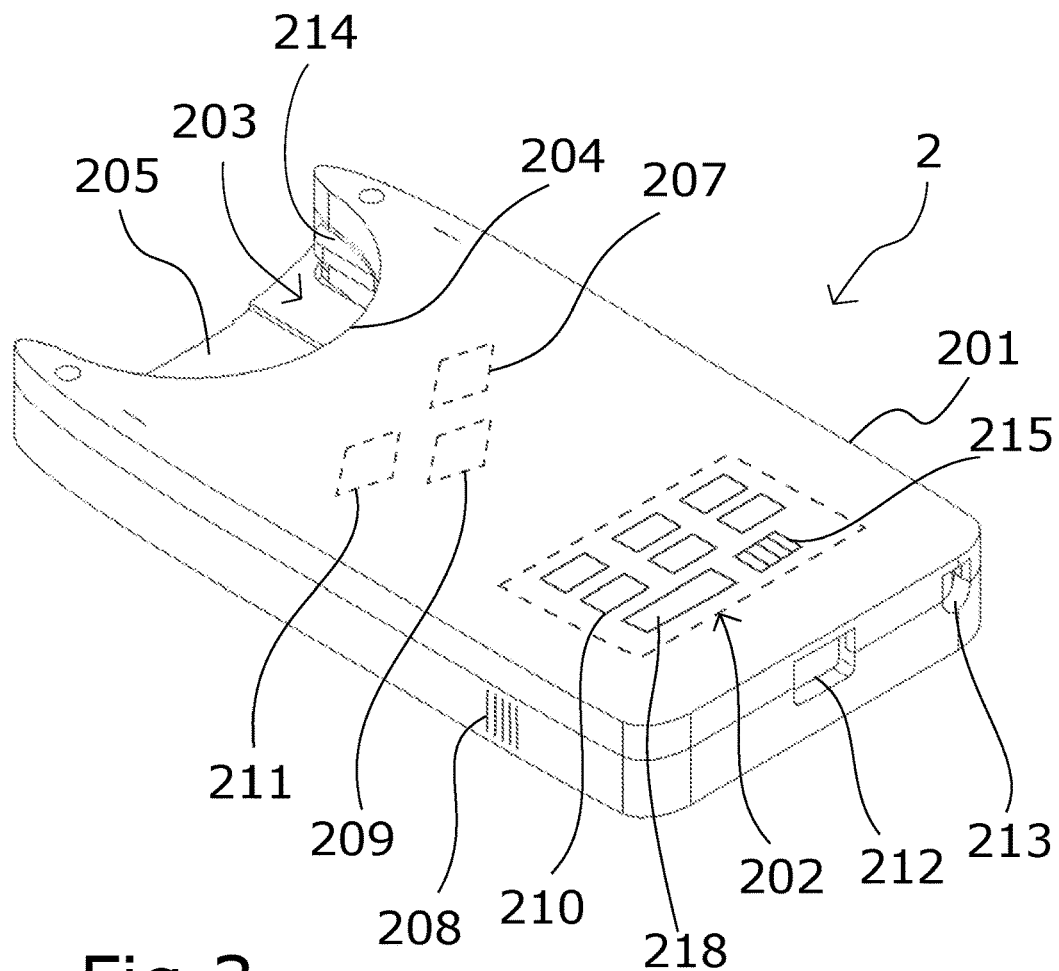
FIG. 3 shows a perspective view of a central device of a system according to the invention.
Figure 2:
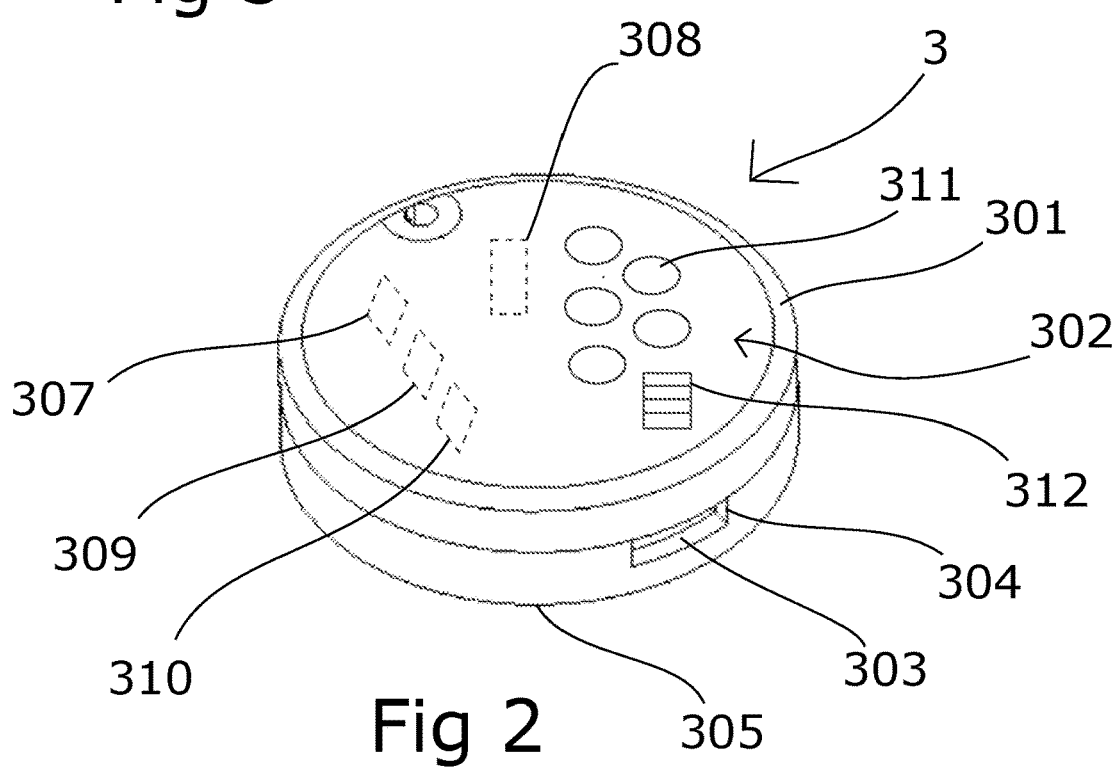
FIG. 2 shows a perspective view of a peripheral device of a system according to the invention.

Reference is now also made to FIGS. 2 and 3. FIG. 2 shows a perspective view of the peripheral device 3. The peripheral device 3 generally comprises an ID memory chip 308. The peripheral device 3 may further optionally comprise one or more of an input unit 302, a connection element 303, and one or more sensors 309. It is noted that the input unit 302 is optional. The peripheral device 3 may further optionally comprise a controller or processor. All said components are arranged in the housing 301. The peripheral device 3 may further and optionally comprise a transmit/receive unit 307.

FIG. 3 shows a perspective view of the central device 2. The central device 2 generally comprises an input unit 202, a connection element 203, a transmit/receive unit 207, a feedback unit 208 and a processor or microcontroller 211. All said components are arranged in the housing 201.

Referring first specifically to FIG. 2, the peripheral device 3 will be described. The input unit 302 is configured to receive input through one or more of tactile input units 311, an acoustic input unit 312 and a gesture recognition input unit 310 provided on the peripheral device 3. The tactile input units 311 are typically buttons or switches. The acoustic input unit 312 is typically a microphone or other sound sensor. More generally, acoustic input units are intended to encompass any input unit configured for perceiving sound and converting the sound to a signal which the central device may process. More generally, tactile input units are intended to mean any input unit configured such as to be perceivable by the sense of touch of a user. Examples are buttons or surface sections with raised parts, for example having different shapes or comprising tactile identification means, e.g. braille signs. Gesture recognition input is taken to mean input provided by a sensor detecting movement and proximity of, e.g., the operators hand over the device, or through detecting physical translation/acceleration of the device itself.

Where provided, the transmit/receive unit 307 is configured to receive and transmit data signals to and from the central device 2 over a radio-based communication protocol. The transmit/receive unit 307 may comprise a transmitter and a receiver or may be a transceiver. The transmit/receive unit 307 is configured to transmit input received by the input unit 302 to the central device 2, and more specifically to the processor 211 of the central device 2. The transmit/receive unit 307 is also configured to receive data signals from the central device 2. The transmit/receive unit 307 may also be a flash memory.

Where provided, the processor or controller (not shown) of the peripheral unit 3 is configured to control the peripheral device 3 to measure or detect at least one of an object, a property of an object and a property of the surroundings, for instance by switching to the relevant sensor. The processor or controller may perform the control based on the input received from the central device 2. The processor or controller may additionally, or alternatively, perform the control based on input received from the input unit 302 of the peripheral device 3.

Where provided, the one or more sensors 309 are configured to measure or detect at least one of an object, a property of an object and a property of the surroundings. The one or more sensors 309 may perform the measurement or detection based on input received from the central device 2. In the embodiment shown, the peripheral device 3 comprises one sensor 309. Other numbers of sensors and/or detectors are, however, also feasible. A list of exemplary measurements, and thus sensors 309, supported by the peripheral device 3 is given in Table 1 below.

TABLE 1

| Function | Type of Sensor | Value |
|---|---|---|
| Spoken word air thermometer & humidity | Thermometer, Hygrometer | For detecting air temperature and humidity |
| Spoken word food thermometer probe | Thermometer | For detecting food temperature. |
| Spoken word body/fever thermometer | Thermometer | Allows regular convenient self measurement of forehead temperature in the case of illness with mouth or infras-red sensing |
| Magnifying glass with LED | | 5-7 cm magnifying glass with warm/cold LED light for viewing objects. |
| Reading magnifying glass with LED | | Larger square magnifying glass with warm/cold LED light for reading in sustained manner. |
| Ultrasonic distance gauge | Ultrasonic sensor | For avoidance of collisions at head height. (Requires that device is worn around neck or otherwise mounted on wearer). |
| Spoken word colour recognition | Color sensor | Detection of colours where physical identification by touch is not possible |
| Spoken word length measurement gauge | Tape Measure/Caliper | Measurement of object length |
| Spoken word pedometer/step counter | Step counter | Keeping track of activity is difficult for many sight-impaired persons and having a step counter is a motivational factor for many |
| Multi-colour flashlight | | Different visual conditions result in some eyes being more or less sensitive to different light frequencies. The device supports a multi-lens flashlight capable of providing adjustable light frequencies |
| Monitoring of internal climate | $CO_2$ sensor, gas sensor, hygrometer | Monitoring of home/indoors for $CO_2$, humidity and/or toxic vapours |
| Smoke alarm | Smoke detector | Plugin to provide smoke detection when user is asleep |
| Spoken word Heart rate/oximeter | Pulse meter | Regular convenient self measurement of pulse and blood oxygen levels for elderly blind persons |
| Large print screen | | Yellow/blue colour LED screen for displaying time or other information in large high-contrast format. |
| Spoken word kitchen scales | Weight sensor | Weight measurement with audio feedback to user. |

The peripheral device 3 may further optionally comprise an output unit (not shown) which may for instance be or comprise one or more of a screen, a display or a microphone.

The connection element 303 is configured for connection with at least a part of a connection element 203 provided on the central device 2. The connection elements 303 and 203 will be described in further detail below.

Referring now specifically to FIG. 3, the central device 2 will be described. The input unit 202 is configured to receive input through one or more of tactile input units 210, an acoustic input unit 215, and a gesture recognition input unit 218 provided on the central device 2. The tactile input units 210 are typically buttons or switches. The acoustic input unit 215 is typically a microphone or other sound sensor. The input unit 202 transfers the input received to the processor 211.

The transmit/receive unit 207 is configured to receive and transmit data signals to and from the peripheral device 3. The transmit/receive unit 207 may comprise a transmitter and a receiver or may be a transceiver.

The processor 211 is configured to detect the ID memory chip 308 of the peripheral device 3 when a peripheral device 3 is connected to the central device 2, to read data contained in the ID memory chip 308 of the peripheral device 3, and to control the one or more peripheral devices 3 to perform at least one action.

The processor 211 may further be configured such that the action that the peripheral device 3 is caused to perform is to measure or detect at least one of an object, a property of an object and a property of the surroundings.

The processor 211 may perform the control based on the input received from the input unit 202. The processor 211 may additionally, or alternatively, perform the control based on input received from the input unit 302 of the peripheral device 3.

The feedback unit 208 is configured to provide an audible feedback. Particularly, the feedback unit 208 is configured to provide an audible feedback in dependence of the at least one action performed by the peripheral device 3. The processor 211 is thus further configured to receive a signal indicative of the action performed from the peripheral device 3.

The feedback may for instance be provided in dependence of at least one of an object, a property of an object and a property of the surroundings measured or detected by the one or more peripheral devices. The feedback unit 208 is typically a loudspeaker. The audible feedback may for instance be sounds or spoken word. Optionally, the feedback unit 208 may also be configured to provide an audible feedback on completion of each and every operation or operational step of the central device 2 and/or the peripheral device 3. Exemplary operations or operational steps include transmission or receipt of a signal at the central device 2 or the peripheral device 3, when connection between the central device 2 and the peripheral device 3 is detected, the type of peripheral device 3 connected to the central device 2, configurational steps, measurement steps and so forth.

The central device may also, alternatively or additionally, comprise a further feedback unit 209 which is configured to provide tactile or haptic feedback. Particularly, the feedback unit 209 is configured to provide tactile or haptic feedback in dependence of at least one of an object, a property of an object and a property of the surroundings measured or detected by the one or more peripheral devices. The feedback unit 209 is typically a vibrator unit. The tactile feedback may for instance be a vibration. Optionally, the feedback unit 209 may also be configured to provide tactile feedback on completion of each and every operation or operational step of the central device 2 and/or the peripheral device 3.

The central device may also, alternatively or additionally, comprise a further feedback unit which is configured to provide visual feedback. Particularly, the feedback unit is configured to provide visual feedback in dependence of at least one of an object, a property of an object and a property of the surroundings measured or detected by the one or more peripheral devices. The feedback unit may typically be in the form of colored LED lighting distributed on the central device 2, or a display attached to the central device.

The central device 2 may also comprise an inlet port 212 for connection to a charger and an inlet port 213 for connection to an external device, such as a set of headphones. As shown, the inlet port 212 and the inlet port 213 are provided as two separate inlet ports. However, it is also feasible that the inlet port 212 and the inlet port 213 may be one and the same inlet port.

The connection element 203 is configured for connection with the connection element 303 provided on the peripheral device 3. The connection elements 303 and 203 will now be described in further detail.

Generally, the connection element 203 of the central device 2 is configured for physical and data transfer connection to a complementary connection element 303 provided on the peripheral device 3 such as to enable data transfer between the central device 2 and the peripheral device 3. To this end, the connection element 203 of the central device 2 is configured for communication with a plurality of pre-defined communication protocols.

The central device 2 may optionally be configured to transmit data over a wire or radio-based protocol to a computer, mobile phone or central Internet server.

The connection element 303 of the peripheral device 3 comprises at least one pin. Although not visible on FIG. 2, the pins are arranged in a slot 304, which is configured for enabling connection to at least a part of the connection device 203 of the central device 2.

The connection element 203 of the central device 2 comprises a plurality of pins which are not visible on the figures. Each pin of the plurality of pins is dedicated for communication with a pre-defined communication protocol of the plurality of pre-defined communication protocols. Particularly, the plurality of pins, and thus the connection element 203, is configured to support any combination of SPI, I2C, I2S audio, Pulse Wave Modulation and GPIO control operations in isolation or in parallel. The plurality of pins may for instance comprise 10 pins, 12 pins, 14 pins, 16 pins, 18 pins, 20 pins, 22 pins and 24 pins, although another number of pins are also feasible. The connection element 203 of the central device 2 may further be configured to support a plurality of different input voltages, such as input voltages of 5 V, 3.3 V and 1.8 V.

Figures 6, 7:
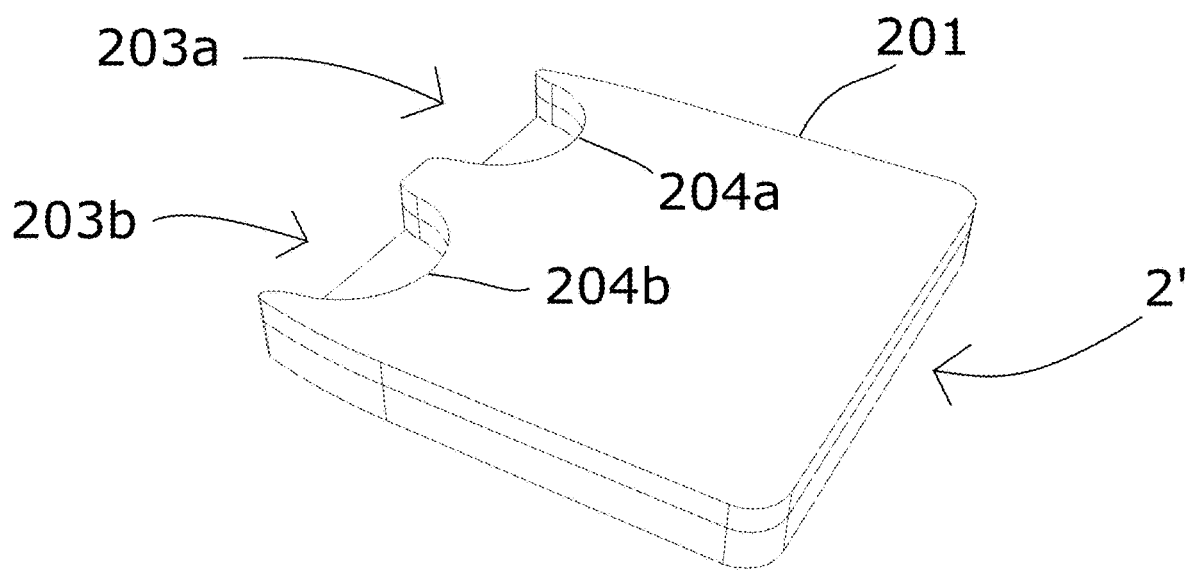
FIG. 6 shows an overview of an exemplary embodiment of a connection element of a central device of the system according to the invention.
FIG. 7 shows a perspective view of an alternative central device of a system according to the invention.

FIG. 6 illustrates an exemplary setup of a connection element 203 comprising 24 pins 20301-20324 arranged in two groups each of 12 pins. Each of the 24 pins 20301-20324 is dedicated for communication with a pre-defined communication protocol, such that the 24 pins 20301-20324 together support a plurality of pre-defined communication protocols, power supply voltages and grounding pins. The embodiment shown in FIG. 6 is merely one feasible and non-limiting example of how the connection element 203 may be made. Many other combinations of different types, combinations and numbers of pins are also feasible.

One of the pins, in the embodiment shown on FIG. 6 pin number 20319, may be configured to form a detection pin 206. Alternatively, or additionally, the central device 2 may comprise a detection pin 206 arranged separately from the connection element 203 of the central device 3. In any event, the detection pin 206 is configured to enable the central device 2 to automatically detect a peripheral device 3 upon connection of the peripheral device 3 to the central device 2.

The detection pin 206 may further be configured to enable the central device 2 to automatically identify the peripheral device. Automatic identification may be achieved by the central device 2 being configured to, via the detection pin 206, automatically detect and read an ID memory chip 308 (FIG. 2) of the peripheral device 3 upon detection of the peripheral device 3. The peripheral device 3 may also comprise a complementary detection pin 306 (FIG. 5) configured for connection to the detection pin 206 of the central device 2.

The wide variety of pins of the connection element 203 allow for rich variety of capabilities to be managed on the peripheral. These include, but are not necessarily limited to the following:

PWM control of MOSFET gates to control power to LEDs, motors or other devices requiring power to be supplied to them. This control signal is provided over the GPIO pins of the connector and can be routed to the control gate(s) of MOSFETs to provide on/off switching capability. The power can be drawn from any or all of the 5V, 3.3V or 1.8V power supply pins.

I2C and SPI to support interaction with a large number of standard sensors for such quantities as light, color, temperature, humidity, memory storage, gas sensors and accelerometers.

Analog output from sensors via the GPIO pins, thus permitting the central device 2 to measure data from analog sensors for gas, capacitive and resistive sensing of soil humidity.

Connection to LED screen for display of data.

I2S pins allow the connection to an audio decoder for playback of music in MP3, AAC and other formats over a loudspeaker, as well as recording audio from a microphone.

The WRITE pin, cf. pin number 19 on FIG. 6, which is normally held in a high voltage stage when connected to the central device can be used to keep the flash memory identification chip in a Read-only state.

In case multiple sensors are provided on a peripheral device 3, these can be operated and operate in parallel, provided that they have different ad-dresses.

When operating an SPI device, the SPI_CS line may be used to signal to the central device 2 that it should listen for data on the common SPI_MOSI line. If more than one SPI device is present in the peripheral device 3, the second and third devices can be controlled using the GPIO lines and SPI chip select lines.

When multiple I2C devices are present on the peripheral device 3, each of these must be configured with a different I2C address to ensure that no bus collisions occur when transferring data to/from the devices.

For correct interaction with the central device 2, the peripheral device 3 only needs to support/connect a limited number of pins: GND, VCC33V, DEVDE-TECT and some means to allow identification of the peripheral. Peripheral devices 3 can thereby be made with the cheapest, least complex connection element 303 which supports their operation.

Referring now again to FIG. 3, the central device 2 may further comprises an incision or a cut-out 204 shaped to conform to an external shape of the housing 301 of one or more peripheral devices 3. The cut-out 204 is configured to allow the peripheral device 3 to be connected to the central device 2 in only one predefined orientation.

The cut-out 204 may further comprise a plate-shaped element 205 adapted for interaction, particularly abutment, with a corresponding structure on the peripheral device 3. The plate-shaped element 205 is in the embodiment shown a bottom element adapted for interaction, particularly abutment, with a corresponding structure on a bottom surface 305 (FIG. 2) of the peripheral device 3. The plate-shaped element 205 may alternatively, or additionally, be a top element adapted for interaction, particularly abutment, with a corresponding structure on a top surface of the peripheral device 3. The plate-shaped element 205 and the corresponding structure on the peripheral device may be shaped such that connection of the peripheral device 3 to the central device 2 is only possible in one particular pre-determined direction and orientation. This may be obtained by providing suitable surface structures in or on the plate-shaped element 205 of the central device 2 and in or on the bottom surface 305, or top surface, of the peripheral element 3. Thereby, correct connection of the peripheral device 3 to the central device 2 is obtained in a manner being easy, simple and tactile detectable, and thus being particularly suitable and simple for to blind or visually impaired people.

The cut-out 204 may further be provided with a protrusion 214 configured to holding the peripheral device 3 in place when connected to the central device 2. The protrusion may be or comprise a friction-locking element or a snap-locking element. A corresponding incision, friction-locking element or snap-locking element may be provided on the peripheral device 3 for cooperating with the protrusion 214.

Figure 4:
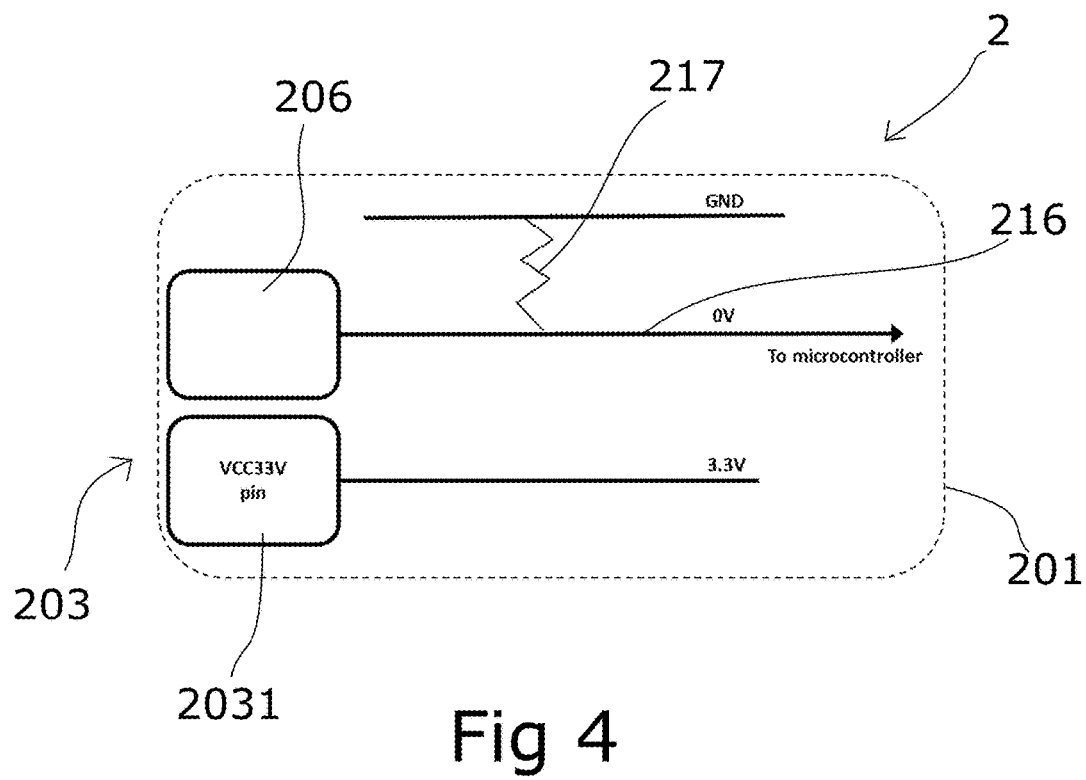
FIG. 4 shows a schematical overview of the electronics of a central device of a system according to the invention when no peripheral device is connected to the central device.
Figure 5:
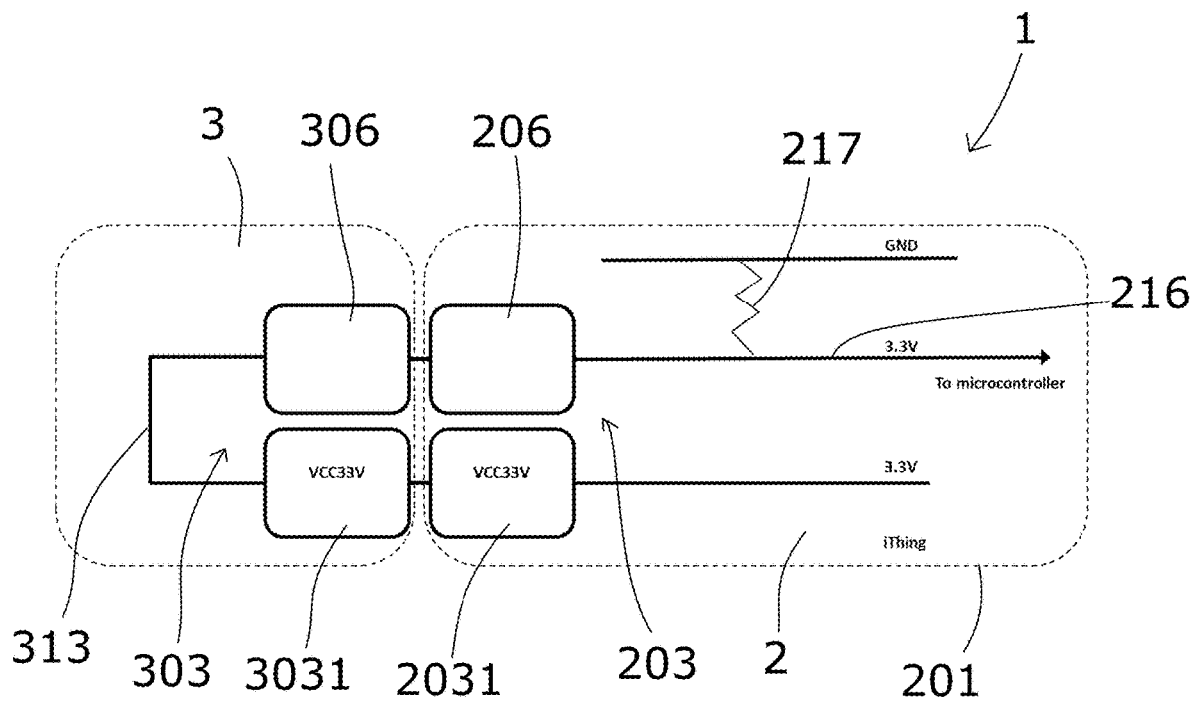
FIG. 5 shows a schematical overview of the electronics of a central device and a peripheral device of a system according to the invention when a peripheral device is connected to the central device.

Referring now also to FIGS. 4 and 5, the technical operation of the system 1 according to the invention will be described in further detail.

FIG. 4 illustrates a situation where no peripheral device 3 is attached to the central device 2, and where the central device 2 is thus not in use. In such a situation, the central device 2 is in a low-energy sleep or stand-by state. The VCC33V pin 2031 on the connector element 203 is kept active, however. The VCC33V pin 2031 is a VCC pin configured to support a voltage of 3.3 V. As may be seen on FIG. 4, the central device 2 comprises a detection pin 206. The detection pin 206 is connected to the microcontroller 211 by a detection line 216 connected to ground, GND, via a resistance 217. The resistance 217 in the embodiment shown is a 10 kOhm resistance. When no peripheral device 3 is attached to the central device 2, the detection line 216 has a zero voltage.

FIG. 5 illustrates a situation where a peripheral device 3 is attached to the central device 2, and where the central device 2 is thus in use.

Generally, and as illustrated on FIG. 5, the peripheral device 3 comprises a loopback circuit 313 running from the VCC33V pin 2031 to the detection pin 306. When a peripheral device 3 is attached to the central device 2, a voltage is made available to the peripheral device 3 via the VCC33V pin 2031. This voltage is by the loopback circuit 313 also provided to the detection pin 306.

When sleeping or in stand-by mode, the central device 2 is configured to be able to detect a change in voltage on the detection line 216 attached to the detection pin. When the peripheral device 3 is attached to the central device 2, the voltage on the detection line 216 is raised via the detection pin 206, in the embodiment shown on FIG. 5 to 3.3 V. The detection of this voltage change causes the central device 2 to power up and commence normal operation. Alternatively, the same effect could be achieved instead by the detection line 216 being pulled initially to a non-zero voltage in unconnected state and then being pulled to ground when a peripheral device 3 is connected to the central device 2.

The central device 2 then proceeds to interrogate the peripheral device 3 to determine which kind of device it is. This can be done via a number of means, such as using a I2C communication bus, a SPI bus or some other mechanism making use of the GPIO pins. A preferred solution is to make use of I2C to communicate with a memory chip 308 (FIG. 2) with pre-determined I2C address. This memory chip 308 contains a type identifier for the peripheral device 3, as well as a serial number and optionally also calibration data and settings for any sensors on the peripheral device 3. The logic regarding serial numbers can be implemented in such a way that copied peripheral devices 3 or invalid serial numbers will not be permitted to operate with or on the central device 2. Serial numbers can also be registered as belonging to a particular user, through a connection to a mobile phone, thus reducing the risk of theft.

Based on the type of the peripheral device 3, the microcontroller 211 of the central device 2 may load the correct driver software to manage the peripheral device 3 and inform the user what type of peripheral device 3 has been attached to the central device 2. The input device 202 of the central device 2 may also take on different functions, depending on what capabilities need to be managed for the peripheral device 3.

If the peripheral device 3 is removed or disconnected from the central device 2, the loss of voltage triggered on the detection pin 206 allows the central device 2 to detect this removal and inform the user. The central device 2 may then power down and enter sleeping or stand-by mode.

Generally, the system 1 according to the invention is configured to enable transmission and reception of data over wireless data connections, such as Bluetooth and WIFI. This applies to both the central device 2 and the one or more peripheral devices 3.

The system 1 according to the invention is controlled and configured primarily by interaction through the input unit 202 on the central device 2 and, where provided, through the input unit 302 on the one or more peripheral devices 3.

The system 1 according to the invention may further be controlled and configured through an app, such as an app on a SmartPhone or a tablet computer. Therefore, at least the central device 2 may be configured to communicate with the app via wireless protocols, such as typically Bluetooth or WIFI.

In either case, key parameters to be configured may include, but are not necessarily limited to, one or more of the following:
- Device owner.
- Device firmware updates.
- Configuration of device language/gender.
- Configuration of preference for units for measurement.
- Device locator (if lost within vicinity, e.g. within a particular house or room).
- Shutdown of device
- Software updates, such as to allowing the device to recognize and manage new peripheral products as these are developed.

The central device 2 and the peripheral devices 3 may be powered by means of a battery. The battery may be a rechargeable battery, thereby eliminating the need for regular battery changes.

Referring finally to FIG. 7, a perspective view of an alternative central device 2' of a system 1 according to the invention is shown. As also mentioned above, it is generally feasible that more than one peripheral device 3 may be connected to the central device 2, 2' at the same time. The central device 2' illustrates one embodiment making this possible. In the embodiment shown, the central device 2' comprises two cut-outs 204a and 204b, each comprising a connection element 203a and 203b, respectively. Each of the two cut-outs 204a and 204b may thus receive a peripheral device 3 to be connected with its connection element 303 to the connection element 203a and 203b, respectively, of the central device 2'.

In an alternative, where the central device 2 comprises only one connection element 203, the connection elements 303 of the peripheral devices may be adapted for enabling full functionality while being connected to only some of the pins of the connection element 203 of the central device 2. Alternatively, the central device 2, 2' may also comprise an adaptor enabling two (or more) peripheral devices 3 to be connected simultaneously to the central device 2. In that way it is feasible that two (or more) peripheral devices 3 may be connected simultaneously to the central device 2 by use of the connection element 203.

Similarly, a peripheral may connect to the main unit by means of a radio-based communication protocol such as WIFI or Bluetooth over shorter distances.

In other aspects the present invention also relates to a system, the system comprising an Internet of Things (IoT) enabled central device comprising a transmitter/receiver, a processor and a feedback unit, and one or more peripheral devices to be IoT enabled and comprising at least one sensor or property to be controlled remotely, the central device being configured to by the transmitter/receiver, receive and transmit data signals to and from the one or more peripheral devices, by the processor, receive input through one or more of tactile input units, acoustic input units and gesture recognition input units, provided on one or more of the central device itself and the one or more peripheral devices, by the processor, control, preferably based on the input, the one or more peripheral devices to measure or detect at least one of an object, a property of an object and a property of the surroundings, and by the feedback unit, provide at least one of audible, visual and tactile feedback in dependence of at least one of an object, a property of an object and a property of the surroundings measured or detected by the one or more peripheral devices, wherein the central device further comprises a connection element configured for physical connection to a complementary connection element provided on at least one of the one or more peripheral devices such as to enable data transfer between the central device and the peripheral device, and wherein the connection element of the central device is configured for communication with a plurality of pre-defined communication protocols.

The central device which is IoT enabled may comprise any one or more of the features mentioned herein in relation to the central device 2.

The one or more peripheral devices to be IoT enabled may comprise any one or more of the features mentioned herein in relation to the peripheral device 3.

Especially, the connection element of the central device being IoT enabled may comprise any one or more of the features related to the connection element 203 of the central device 2 mentioned herein.

Likewise, the complementary connection element of the one or more peripheral devices to be IoT enabled may comprise any one or more of the features related to the connection element 303 of the peripheral device 3, respectively, mentioned herein.

In this aspect, the peripheral device which is to be IoT-enabled may be any suitable device, such as for instance any domestic appliance or industrial machine requiring IoT enablement, and the IoT enabled central device may be a central controller unit for controlling peripheral devices being IoT enabled or transferring data and control information between the peripheral device and some other remote system.

The person skilled in the art realizes that the present invention by no means is limited to the preferred embodiments described above. On the contrary, many modifications and variations are possible within the scope of the appended claims.

The invention claimed is:

1. A system for aiding visually impaired or blind individuals or other individuals with reduced mobility or sensory or cognitive function, in perceiving their surroundings, the system comprising:
   a central device comprising a transmitter/receiver, a processor and a feedback unit, and
   one or more peripheral devices comprising an ID memory chip,
   the central device being configured to:
   a) by the transmitter/receiver, receive and transmit data signals to and from the one or more peripheral devices,
   b) by the processor, receive input through one or more of tactile input units, acoustic input units and gesture recognition input units provided on one or more of the central device itself and the one or more peripheral devices,
   c) by the processor, upon connection to a peripheral device, detect the presence of the peripheral device and thereafter read data contained in the ID memory chip of the peripheral device,
   d) by the processor, control, preferably based on the input and the data read from the ID memory chip, the one or more peripheral devices to perform at least one action, and
   e) by the feedback unit, provide at least one of audible, visual and tactile feedback in dependence of the at least one action performed by the one or more peripheral devices,
   wherein the central device further comprises a connection element configured for at least one of physical connection and connection by means of a radio-based communication protocol to a complementary connection element provided on at least one of the one or more peripheral devices such as to enable data transfer between the central device and the peripheral device, and wherein the connection element of the central device is configured to support communication with any combination of SPI, I2C, I2S audio, Pulse Wave Modulation and GPIO control operations in isolation or in parallel.

2. A system according to claim 1, wherein the connection element of the central device comprises a plurality of pins, and wherein the plurality of pins is configured to support any combination of SPI, I2C, I2S audio, Pulse Wave Modulation and GPIO control operations in isolation or in parallel.

3. A system according to claim 2, wherein the plurality of pins in the connection element comprises any one of 10 pins, 12 pins, 14 pins, 16 pins, 18 pins, 20 pins, 22 pins and 24 pins.

4. A system according to claim 1, wherein the one or more peripheral devices comprising at least one sensor, and wherein the central device further is configured to:
  by the processor, control the one or more peripheral devices to perform an action in the form of measuring or detecting at least one of an object, a property of an object and a property of the surroundings, and
  by the feedback unit, provide at least one of audible, visual and tactile feedback in dependence of at least one of an object, a property of an object and a property of the surroundings measured or detected by the one or more peripheral devices.

5. A system according to claim 1, wherein the connection element of the central device further is configured to support a plurality of different input voltages.

6. A system according to claim 1, wherein the connection element of the central device further comprises a detection pin dedicated and configured to enable the central device to automatically detect a peripheral device of the one or more peripheral devices upon connection of the peripheral device to the central device.

7. A system according to claim 1, wherein the central device comprises a detection pin arranged separately from the connection element of the central device and configured for connection to a complementary detection pin of a peripheral device of the one or more peripheral devices such as to enable the central device to automatically detect the peripheral device upon connection of the peripheral device to the central device.

8. A system according to claim 6, wherein the central device further is configured to, via the detection pin or via a pin of the plurality of pins, automatically detecting an ID memory chip of the peripheral device upon detection of the peripheral device, or through scanning for nearby WIFI and Bluetooth based radio transmissions.

9. A system according to claim 1, wherein the central device comprises an incision or a cut-out shaped to conform to an external shape of the one or more peripheral devices, the incision or the cut-out being configured to allow the peripheral device to be connected to the central device in only one predefined orientation.

10. A system according to claim 1, wherein the central device is configured to any one or more of:
  provide at least one of audible, visual or tactile feedback on each and every operation or operational step of at least one of operating the central device and operating the peripheral device,
  connect with, identify and operate peripheral devices by means of radio-based communication protocols,
  enable providing audible feedback in a plurality of languages selectable by a user, and
  simultaneous physical connection to complementary connection elements provided on at least two peripheral devices comprised by the system such as to enable data transfer between the central device and the at least two peripheral devices.

11. A system according to claim 4, wherein the central device further is configured to, by the processor, control, based on the input, the one or more peripheral devices to perform an action in the form of measuring or detecting at least one of an object, a property of an object and a property of the surroundings.

12. A system according to claim 1, wherein the connection element of the central device is configured to support input voltages of 5 V, 3.3 V and 1.8 V.

13. A system according to claim 8, wherein the complementary connection element of at least one of the one or more peripheral devices comprises a complementary detection pin configured for connection to the detection pin of the connection element of the central device.

14. A system according to claim 1, wherein the radio-based communication protocol is Bluetooth or WIFI.

* * * * *